(12) United States Patent
Xu et al.

(10) Patent No.: US 9,640,985 B2
(45) Date of Patent: May 2, 2017

(54) CIRCUIT BREAKER

(71) Applicant: GE Energy Power Conversion Technology Ltd, Warwickshire (GB)

(72) Inventors: Fei Xu, Shanghai (CN); Wenqiang Yang, Shanghai (CN)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 274 days.

(21) Appl. No.: 14/614,473

(22) Filed: Feb. 5, 2015

(65) Prior Publication Data
US 2015/0236502 A1    Aug. 20, 2015

(30) Foreign Application Priority Data

Feb. 18, 2014 (CN) .......................... 2014 2 0069865

(51) Int. Cl.
H02H 9/00    (2006.01)
H02H 9/02    (2006.01)
H02H 3/02    (2006.01)

(52) U.S. Cl.
CPC ............ *H02H 9/023* (2013.01); *H02H 3/025* (2013.01)

(58) Field of Classification Search
CPC ...................................................... H02H 9/023
USPC ............................................. 361/19, 67, 115
See application file for complete search history.

(56) References Cited

U.S. PATENT DOCUMENTS

| 5,793,586 | A | 8/1998 | Rockot et al. | |
| 7,633,022 | B2 * | 12/2009 | Zols | H01H 9/54 200/51 R |
| 8,503,138 | B2 * | 8/2013 | Demetriades | H01H 9/542 361/11 |
| 8,817,441 | B2 * | 8/2014 | Callanan | H01H 9/542 361/101 |

(Continued)

FOREIGN PATENT DOCUMENTS

| DE | 2410148 A1 | 9/1975 |
| DE | 202012100023 U1 | 4/2012 |

(Continued)

OTHER PUBLICATIONS

European Search Report issued in connection with corresponding EP Application No. 15154807.0 on Jul. 6, 2015.

(Continued)

*Primary Examiner* — Thuy Vinh Tran
(74) *Attorney, Agent, or Firm* — GE Global Patent Operation; Scott R. Stanley

(57) ABSTRACT

A circuit breaker comprising a superconducting fault current limiter and a circuit breaker module, wherein the superconducting fault current limiter and the circuit breaker module are connected in series. The circuit breaker module includes a disconnector, a first semiconductor switch unit, and a second semiconductor switch unit, wherein the disconnector is connected in series with the first semiconductor switch unit, and also connected in series with the superconducting fault current limiter, and the second semiconductor switch unit is connected in parallel with the disconnector and first semiconductor switch unit that are connected in series. The circuit breaker can quickly and securely interrupt a circuit when an overcurrent fault occurs on the circuit.

10 Claims, 4 Drawing Sheets

(56) References Cited

U.S. PATENT DOCUMENTS

2012/0249151 A1* 10/2012 Dobusch ............... H02H 3/335
                                                              324/424
2012/0327538 A1    12/2012 Lim et al.

FOREIGN PATENT DOCUMENTS

| WO | 2009035191 A1 | 3/2009 |
| WO | 2011057675 A1 | 5/2011 |

OTHER PUBLICATIONS

European Search Report and Opinion issued in connection with corresponding EP Application No. 15154807.0 on Oct. 17, 2016.

* cited by examiner

CIRCUIT BREAKER

TECHNICAL FIELD

Embodiments of the present invention relate to a circuit breaker, and in particular, to a high-voltage circuit breaker.

BACKGROUND

In a high-voltage circuit, especially in a high-voltage direct current circuit, for example, power grid, a current is relatively large in the circuit in case of an overcurrent fault (for example a short circuit). If a switch device is disconnected directly to interrupt the circuit, an arc discharge phenomenon may occur on the switch device, which does great harm to the switch device, greatly affects switch device performance, and even damages the switch device. With increasing capacity of a power grid, a short-circuit current also increases, and large arc discharge is easily caused upon disconnecting a switch device, thereby damaging a switch device.

Therefore, it is necessary to provide an improved circuit breaker to solve the foregoing technical problem.

SUMMARY

According to one aspect, the present invention provides a circuit breaker. The circuit breaker includes a superconducting fault current limiter and a circuit breaker module, wherein the superconducting fault current limiter and the circuit breaker module are connected in series, and the circuit breaker module includes a disconnector, a first semiconductor switch unit, and a second semiconductor switch unit. In an embodiment, the disconnector is connected in series with the first semiconductor switch unit, and also connected in series with the superconducting fault current limiter, and the second semiconductor switch unit is connected in parallel with the disconnector and first semiconductor switch unit that are connected in series.

In some embodiments, the circuit breaker module includes a nonlinear resistor, and the nonlinear resistor and the second semiconductor switch unit are connected in parallel.

In some embodiments, the disconnector and the first semiconductor switch unit are normally open, and the second semiconductor switch unit is normally closed.

In some embodiments, the circuit breaker module includes an LC resonant unit and a third semiconductor switch unit connected in series with the LC resonant unit, and the second semiconductor switch unit is connected in parallel with the LC resonant unit and the third semiconductor switch unit that are connected in series.

In some embodiments, the circuit breaker module includes several diodes. The diodes are connected in parallel with the second semiconductor switch unit and the third semiconductor switch unit respectively, and conducting directions of the diodes are respectively opposite to conducting directions of the second semiconductor switch unit and the third semiconductor switch unit that are connected in parallel with the diodes.

In some embodiments, the circuit breaker module includes a nonlinear resistor, and the nonlinear resistor is connected in parallel with the LC resonant unit and the third semiconductor switch unit.

In some embodiments, the third semiconductor switch unit is normally closed.

In some embodiments, the disconnector, the first semiconductor switch unit, the second semiconductor switch unit, and the third semiconductor switch unit are controllable devices.

In some embodiments, the first semiconductor switch unit and the second semiconductor switch unit include at least one semiconductor switch device respectively.

In some embodiments, the superconducting fault current limiter includes a superconducting resistor, a resistor, and an inductor. The resistor and the inductor are connected in series, and the superconducting resistor is connected in parallel with the resistor and the inductor that are connected in series.

BRIEF DESCRIPTION OF DRAWINGS

The present invention may be better understood through the description of embodiments of the present invention with reference to the accompanying drawings. In the accompanying drawings.

DETAILED DESCRIPTION

Unless otherwise defined, the technical terms or scientific terms used in the claims and specification should be the ordinary meaning understood by a person of ordinary skill in the technical field of the present utility model. "First", "second" and similar words used in the specification and claims of the present invention do not denote any order, quantity, or importance, but are just used to distinguish different components. "A" or "an" and other similar words do not denote quantity limitations, but denote that at least one exists. "Or" covers any one or all of listed items. "Comprises" or "comprising" and other similar words imply that an element or object appearing before the "comprises" or "comprising" covers enumerated elements or objects and equivalents elements thereof appearing after the "comprises" or "comprising", and other elements or objects are not excluded. "Connected" or "coupled" and other similar words are not limited to physical or mechanical connections, but may include electrical connections, either in a direct or indirect manner.

Figure 1:
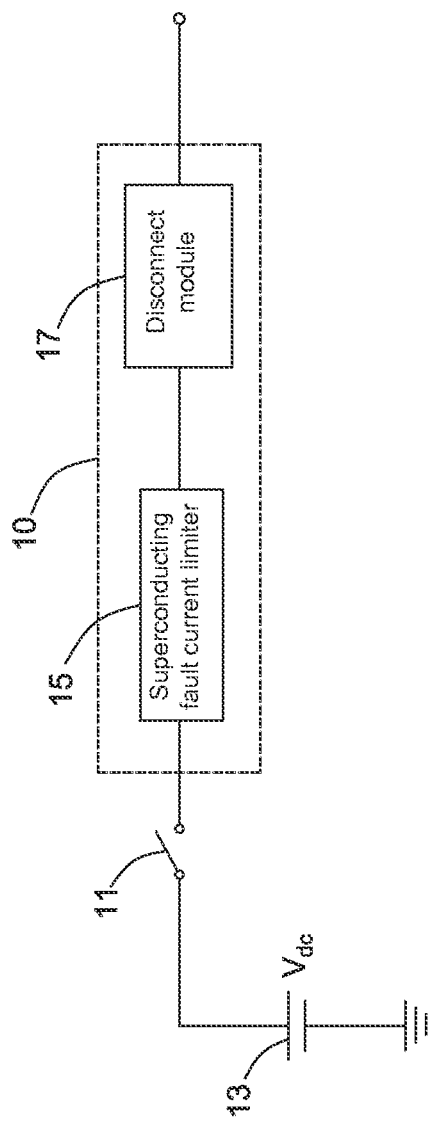
FIG. 1 is a schematic diagram of a circuit breaker according to an embodiment of the present invention.

FIG. 1 is a schematic diagram of a circuit breaker 10 according to an embodiment of the present invention. The circuit breaker 10 in the present embodiment is connected in series with a main switch 11 and power 13. The circuit breaker 10 includes a superconducting fault current limiter 15 and a circuit breaker module 17. The main switch 11, the power 13, the superconducting fault current limiter 15, and the circuit breaker module 17 are connected in series. The circuit breaker 10 can be applied to a high-voltage circuit, especially a high-voltage direct current circuit, for example, power grid, which is not limited thereto. In an embodiment, the power 13 is high-voltage direct current power, for example, a high-voltage direct current power grid, a power generating equipment, or the like, and supplies high-voltage direct current power to a working circuit (not shown in the figure). The circuit breaker 10 is connected between the power 13 and the working circuit (not shown in the figure), and is used to quickly and securely cut off power when an overcurrent fault occurs on the circuit, for example, the circuit is short-circuit, transient current increase due to loads, and the like.

When the circuit is running properly, the circuit breaker 10 is in a conductive state, and cuts off or accesses the power 13 by controlling the turning-on or the turning-off of the main switch 11. When an overcurrent fault occurs on the circuit, a current of the circuit increases dramatically. The main switch 11 is turned off if the current is greater than a rated short circuit breaking current of the main switch 11, and arc discharge may occur on the main switch 11. An embodiment of the present invention uses the circuit breaker 10 to interrupt the circuit. The superconducting fault current limiter 15 of the circuit breaker 10 first limits the current, and then disconnects the circuit through the circuit breaker module 17. The main switch 11 is turned off after the circuit breaker 10 interrupts the circuit, thereby preventing the main switch 11 from generating arc discharge. In an embodiment, the main switch 11 is a mechanical switch, for example, a knife switch.

Figure 2:
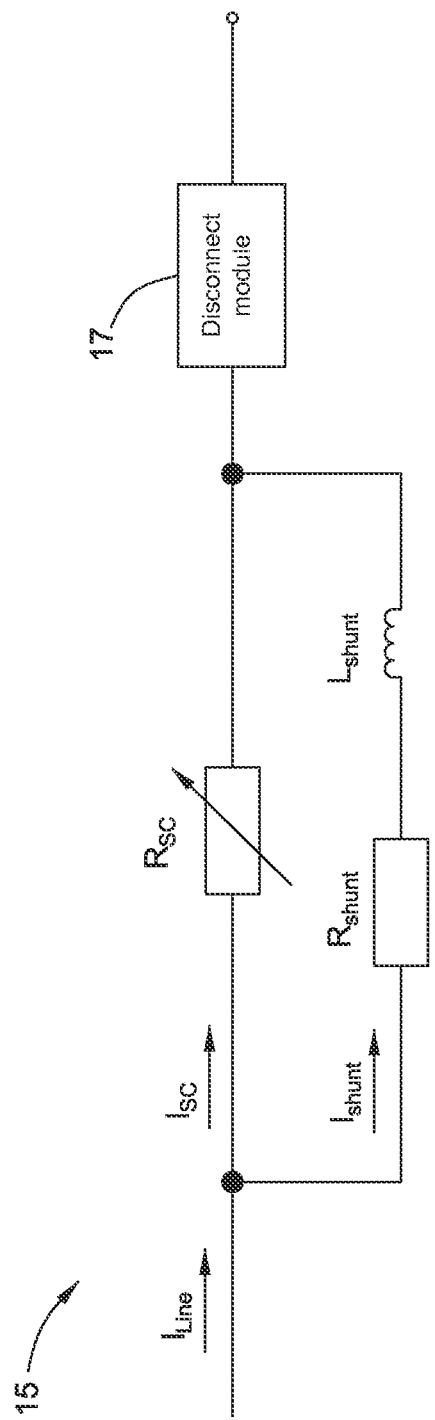
FIG. 2 is a schematic diagram of a superconducting fault current limiter of the circuit breaker shown in FIG. 1.

FIG. 2 is a schematic diagram of the superconducting fault current limiter 15 of the circuit breaker 10 shown in FIG. 1 according to an embodiment. In case of an overcurrent fault, the superconducting fault current limiter 15 can limit a current in a circuit. The superconducting fault current limiter 15 in the present embodiment is a resistive superconducting fault current limiter. The superconducting fault current limiter 15 includes a superconducting resistor $R_{sc}$, a resistor $R_{shunt}$, and an inductor $L_{shunt}$. The resistor $R_{shunt}$ and the inductor $L_{shunt}$ are connected in series, and the superconducting resistor $R_{sc}$ is connected in parallel with the resistor $R_{shunt}$ and the inductor $L_{shunt}$ that are connected in series. The superconducting resistor $R_{sc}$ is made of high-temperature superconducting materials. When the circuit is running properly, a current passing through the superconducting resistor $R_{sc}$ is less than a critical current of the superconducting resistor $R_{sc}$. Because of characteristics of superconducting materials, the superconducting resistor $R_{sc}$ is in a superconducting state, and a resistance value is equal or close to zero. Voltages at both ends of the superconducting resistor $R_{sc}$ are equal or close to zero. A current $I_{sc}$ passing through the superconducting resistor $R_{sc}$ is equal or close to a total current $I_{Line}$, and a current $I_{shunt}$ passing through the resistor $R_{shunt}$ is equal or close to zero. When the circuit is running properly, the superconducting fault current limiter 15 does not affect normal operation or performance of the circuit.

When an overcurrent fault occurs on the circuit, a current of the circuit increases dramatically, the current $I_{sc}$ passing through the superconducting resistor $R_{sc}$ exceeds the critical current of the superconducting resistor $R_{sc}$, and the superconducting resistor $R_{sc}$ loses a superconducting characteristic. In this case, the current $I_{sc}$ passing through the superconducting resistor $R_{sc}$ increases dramatically, the resistance value of the superconducting resistor $R_{sc}$ increases exponentially, and the voltages at both ends of the superconducting resistor $R_{sc}$ become high. The total current $I_{Line}$ is shunted to branches of the resistor $R_{shunt}$ and the inductor $L_{shunt}$. The branches of the resistor $R_{shunt}$ and the inductor $L_{shunt}$ limit increases of the voltages at both ends of the superconducting resistor $R_{sc}$. The inductor $L_{shunt}$ limits a current. In this way, the superconducting fault current limiter 15 limits the current in the circuit. Because of characteristics of superconducting materials, the superconducting fault current limiter 15 can reduce the current within a few milliseconds. After the current in the circuit is reduced, the circuit breaker module 17 is disconnected, so as to cut off the power 13 from the circuit. In another implementation manner, the superconducting fault current limiter 15 may adopt another type of superconducting fault current limiter, such as, a noninductive reactance, or hybrid superconducting fault current limiter.

Figure 3:
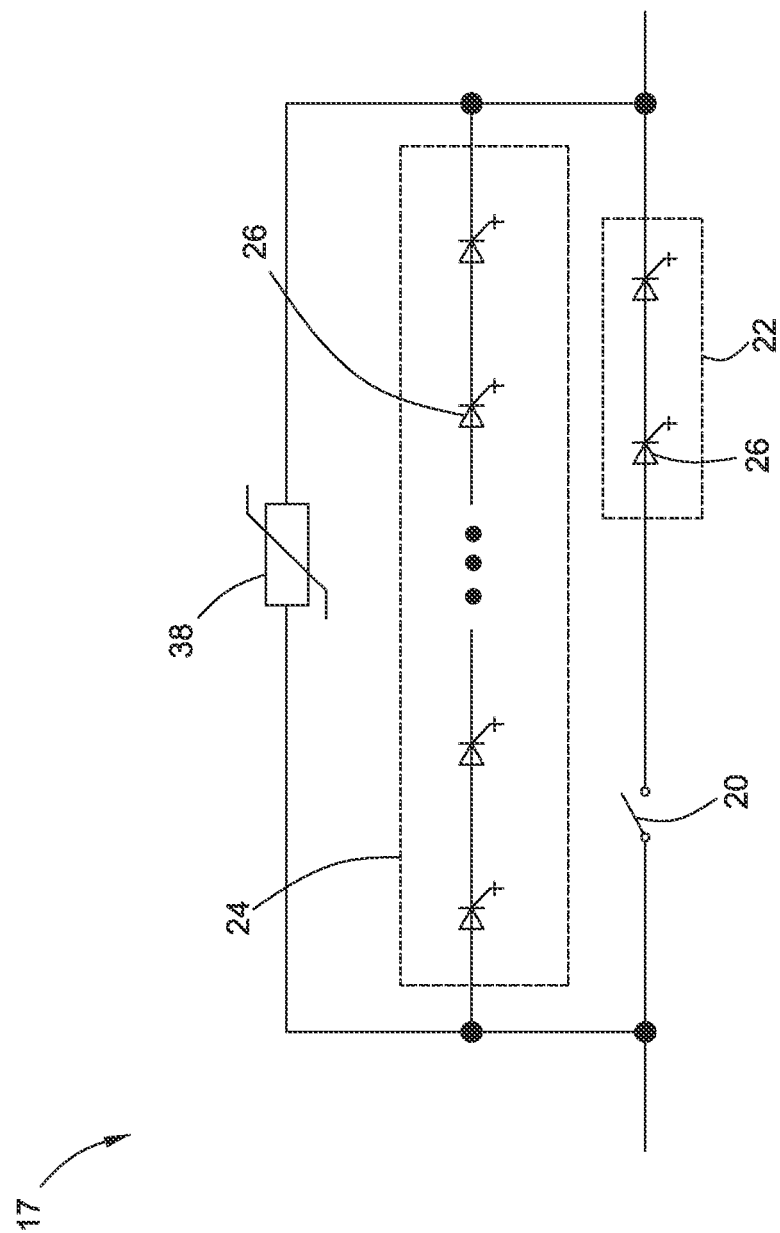
FIG. 3 is a schematic diagram of a circuit breaker module of the circuit breaker shown in FIG. 1.

FIG. 3 is a schematic diagram of a circuit breaker module 17 shown in FIG. 1 according to an embodiment. The circuit breaker module 17 includes a disconnector or isolator 20, a first semiconductor switch unit 22, and a second semiconductor switch unit 24. The disconnector 20 is connected in series with the first semiconductor switch unit 22, and also connected in series with the superconducting fault current limiter 15. The second semiconductor switch unit 24 is connected in parallel with the disconnector 20 and first semiconductor switch unit 22 that are connected in series. The disconnector 20 and the first semiconductor switch unit 22 are normally open, and the second semiconductor switch unit 24 is normally closed. In an embodiment, the disconnector 20 is a fast high-voltage disconnector. The disconnector 20 may be a mechanical switch. The first semiconductor switch unit 22 and the second semiconductor switch unit 24 include at least one semiconductor switch device 26 respectively, such as, a thyristor, an Insulated Gate Bipolar Translator (IGBT), and the like. Multiple semiconductor switch devices 26 of the first semiconductor switch unit 22 are connected in series, and multiple semiconductor switch devices 26 of the second semiconductor switch unit 24 are connected in series to bear a high voltage. In an embodiment, the first semiconductor switch unit 22 and the second semiconductor switch unit 24 adopt the same semiconductor switch device 26. In another embodiment, the first semiconductor switch unit 22 and the second semiconductor switch unit 24 adopt different semiconductor switch devices 26, for example, types, rated parameters, and performance of semiconductor switch devices 26 are different. An impedance of the second semiconductor switch unit 24 is greater than an impedance of the first semiconductor switch unit 22.

When the circuit is running properly, the disconnector 20 and the first semiconductor switch unit 22 are in a conductive state, and a current passes through the disconnector 20 and the first semiconductor switch unit 22. The impedance of the first semiconductor switch unit 22 is relatively small; therefore, there is a relatively small impact on a current and voltage of the circuit. When an overcurrent fault occurs on the circuit, the second semiconductor switch unit 24 is closed to shunt. Then, the first semiconductor switch unit 22 is disconnected, and a total current of the circuit passes through the second semiconductor switch unit 24. Then, the second semiconductor switch unit 24 and the disconnector 20 are disconnected. When a semiconductor switch is disconnected, no arc discharge occurs; therefore, the semiconductor switch can be quickly disconnected. The circuit is interrupted through the semiconductor switch, preventing an arc discharge phenomenon from occurring when the disconnector 20 and a main switch 11 are disconnected directly in case of a high voltage and a large current, and protecting the disconnector 20 and the main switch 11. In addition, the circuit breaker module 17 can be quickly disconnected. The disconnector 20, the first semiconductor switch unit 22, and the second semiconductor switch unit 24 are controllable devices, and their turning-on and turning-off can be controlled through a controller (not shown in the figures).

In an embodiment, such as shown in FIG. 3, the circuit breaker module 17 further includes a nonlinear resistor 38. The nonlinear resistor 38 and the second semiconductor switch unit 24 are connected in parallel. The nonlinear resistor 38 can limit a transient voltage increase of the second semiconductor switch unit 24 when the second semiconductor switch unit 24 is disconnected, thereby preventing damage to the semiconductor switch device 26 of the second semiconductor switch unit 24.

Figure 4:
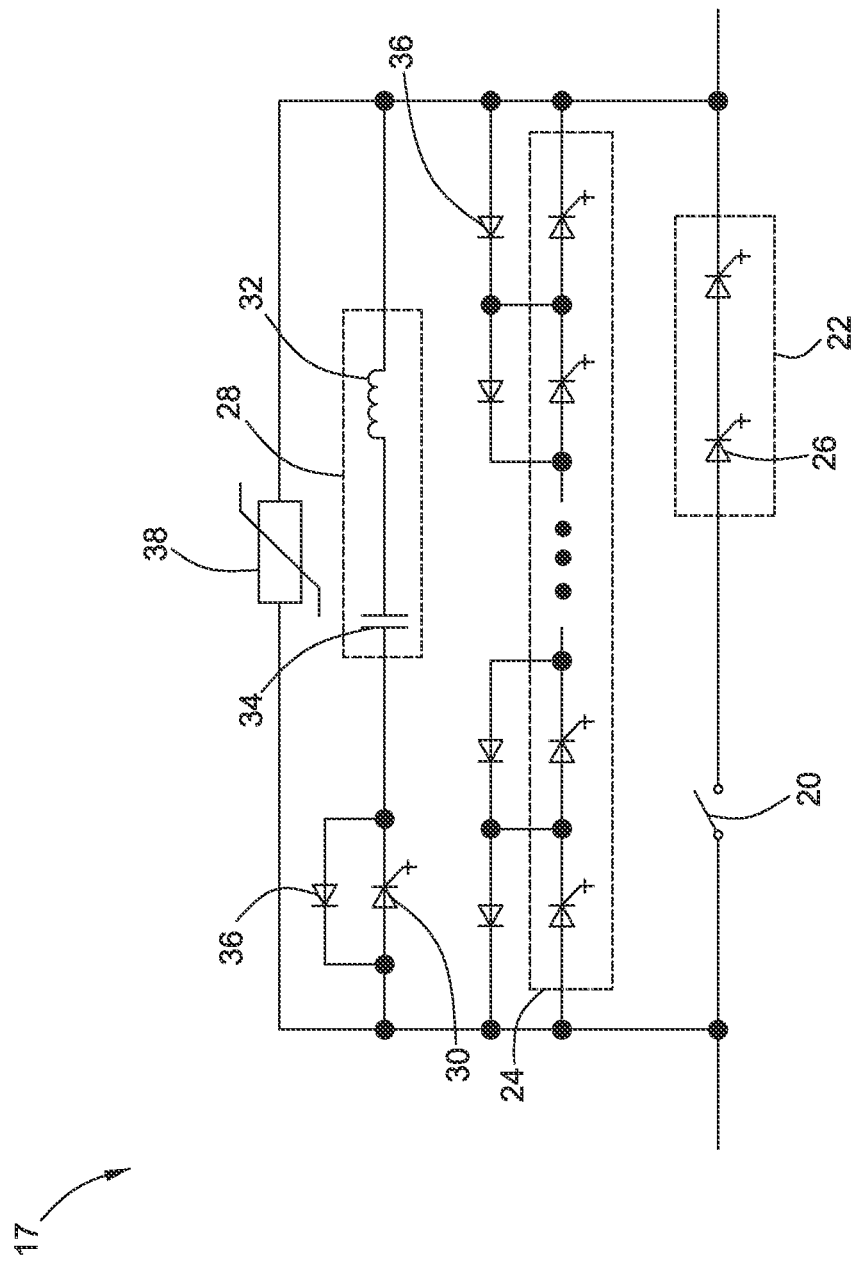
FIG. 4 is a schematic diagram of a circuit breaker module of the circuit breaker shown in FIG. 1.

FIG. 4 is a schematic diagram of a circuit breaker module 17 shown in FIG. 1 according to another embodiment. The circuit breaker module 17 shown in FIG. 4 is similar to the circuit breaker module 17 shown in FIG. 3. For convenience, like elements of the circuit breaker module 17 shown in FIG. 4 and the circuit breaker module 17 shown in FIG. 3 are indicated by the same number. Compared with the circuit breaker module 17 shown in FIG. 3, the circuit breaker module 17 shown in FIG. 4 further includes an LC resonant unit 28 and a third semiconductor switch unit 30 connected in series with the LC resonant unit 28. The second semiconductor switch unit 24 is connected in parallel with the LC resonant unit 28 and the third semiconductor switch unit 30 that are connected in series. The LC resonant unit 28 includes an inductor 32 and a capacitor 34 that are connected in series. The third semiconductor switch unit 30 is normally closed. In an embodiment, the third semiconductor switch unit 30 is a controllable device. In the embodiment shown in FIG. 4, for example, the third semiconductor switch unit 30 includes a semiconductor switch device, and the semiconductor switch device may be the same as the semiconductor switch device 26 of the first semiconductor switch unit 22 and/or the second semiconductor switch unit 24. In some embodiments, the third semiconductor switch unit 30 includes multiple semiconductor switch devices connected in series.

In the present embodiment, the circuit breaker module 17 includes several diodes 36. The diodes 36 are connected in parallel with the second semiconductor switch unit 24 and the third semiconductor switch unit 30 respectively, and conducting directions of the diodes 36 are respectively opposite to conducting directions of the second semiconductor switch unit 24 and the third semiconductor switch unit 30 that are connected in parallel with the diodes 36. Conducting directions of the semiconductor switch devices 26 of the first semiconductor switch unit 22, the second semiconductor switch unit 24, and the third semiconductor switch unit 30 are the same as a direction of a total current ILine of a main circuit. Conducting directions of the diodes 36 are opposite to the direction of the total current ILine of the main circuit. The circuit breaker module 17 further includes a nonlinear resistor 38. The nonlinear resistor 38 is connected in parallel with the LC resonant unit 28 and the third semiconductor switch unit 30. When a current passing through the nonlinear resistor 38 increases, a resistance value of the nonlinear resistor 38 decreases.

When the circuit is running properly, only the disconnector 20 and the first semiconductor switch unit 22 are in a conductive state. In this case, a resistance value of the nonlinear resistor 38 is very large, which has a relatively small impact on a current of the circuit. When an overcurrent fault occurs on the circuit, the second semiconductor switch unit 24 is closed to shunt, and the first semiconductor switch unit 22 is disconnected. Then, the third semiconductor switch unit 30 is closed. In this case, the LC resonant unit 28, the second semiconductor switch unit 24, the third semiconductor switch unit 30, and the diodes 36 form a resonant loop. When a resonant current is equal to zero, the second semiconductor switch unit 24 and the third semiconductor switch unit 30 are disconnected. Then, the disconnector 20 is disconnected. In some embodiments, after the first semiconductor switch unit 22 is disconnected, no current passes through the disconnector 20, and in this case, the disconnector 20 can be disconnected. Therefore, when a current passing through the second semiconductor switch unit 24 and the third semiconductor switch unit 30 is equal to zero, the second semiconductor switch unit 24 and the third semiconductor switch unit 30 are disconnected, protecting the second semiconductor switch unit 24 and the third semiconductor switch unit 30. After the third semiconductor switch unit 30 is disconnected, the capacitor 34 discharges through the diodes 36, and the nonlinear resistor 38 absorbs remaining energy of the capacitor 34.

Although the present invention is described with reference to specific embodiments, a person skilled in the art should understand that, many modifications and variations may be made for the present invention. Therefore, it should be aware that, intention of the claims lies in all the modifications and variations covered in a real concept and scope of the present invention.

This written description uses examples to disclose the invention, including the preferred embodiments, and also to enable any person skilled in the art to practice the invention, including making and using any devices or systems and performing any incorporated methods. The patentable scope of embodiments of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit breaker comprising:
   a superconducting fault current limiter; and
   a circuit breaker module comprising a disconnector, a first semiconductor switch unit, and a second semiconductor switch unit,
   wherein the superconducting fault current limiter and the circuit breaker module are connected in series, the disconnector is connected in series with the first semiconductor switch unit and the superconducting fault current limiter, and the second semiconductor switch unit is connected in parallel with the disconnector and first semiconductor switch unit that are connected in series.

2. The circuit breaker according to claim 1, wherein the circuit breaker module further comprises a nonlinear resistor, and the nonlinear resistor and the second semiconductor switch unit are connected in parallel.

3. The circuit breaker according to claim 1, wherein the disconnector and the first semiconductor switch unit are normally open, and the second semiconductor switch unit is normally closed.

4. The circuit breaker according to claim 1, wherein the circuit breaker module further comprises:
   an LC resonant unit; and
   a third semiconductor switch unit,
   wherein the LC resonant unit and the third semiconductor switch unit are connected in series with the LC resonant unit, and the second semiconductor switch unit is connected in parallel with the LC resonant unit and the third semiconductor switch unit that are connected in series.

5. The circuit breaker according to claim 4, wherein the circuit breaker module further comprises several diodes, the diodes are connected in parallel with the second semiconductor switch unit and the third semiconductor switch unit respectively, and conducting directions of the diodes are respectively opposite to conducting directions of the second semiconductor switch unit and the third semiconductor switch unit that are connected in parallel with the diodes.

6. The circuit breaker according to claim 5, wherein the circuit breaker module further comprises a nonlinear resistor, and the nonlinear resistor is connected in parallel with the LC resonant unit and the third semiconductor switch unit.

7. The circuit breaker according to claim 4, wherein the third semiconductor switch unit is normally closed.

8. The circuit breaker according to claim 4, wherein the disconnector, the first semiconductor switch unit, the second semiconductor switch unit, and the third semiconductor switch unit are controllable devices.

9. The circuit breaker according to claim 4, wherein the first semiconductor switch unit comprises comprise at least one semiconductor switch device and the second semiconductor switch unit comprises at least one semiconductor switch device.

10. The circuit breaker according to claim 1, wherein the superconducting fault current limiter comprises a superconducting resistor, a resistor, and an inductor, the resistor and the inductor are connected in series, and the superconducting resistor is connected in parallel with the resistor and the inductor that are connected in series.

* * * * *